United States Patent [19]

Squires

[11] Patent Number: 5,050,016

[45] Date of Patent: Sep. 17, 1991

[54] DISK DRIVE SERVO SYSTEM USING GAIN LIMITED HIGH-FREQUENCY TRACK-FOLLOWING COMPENSATOR

[75] Inventor: John P. Squires, Boulder, Colo.

[73] Assignee: Conner Peripherals, Inc., San Jose, Calif.

[21] Appl. No.: 420,370

[22] Filed: Oct. 12, 1989

[51] Int. Cl.⁵ .................. G11B 5/596; G11B 21/10
[52] U.S. Cl. .................. 360/77.08; 360/77.02; 369/44.29
[58] Field of Search ............ 360/75, 77.01–77.11, 360/78.01, 78.04–78.14; 369/32, 33, 41, 43, 44.28, 44.29, 44.31, 44.35, 44.36

[56] References Cited

U.S. PATENT DOCUMENTS

| | | | |
|---|---|---|---|
| 4,326,226 | 4/1982 | Touchton et al. | 360/77.05 |
| 4,511,938 | 4/1985 | Betts | 360/77.08 |
| 4,775,903 | 10/1988 | Knowles | 360/77.04 |
| 4,887,173 | 12/1989 | Sengoku et al. | 360/78.04 |
| 4,954,908 | 9/1990 | Sengoka | 360/78.04 |

*Primary Examiner*—Aristotelis M. Psitos
*Assistant Examiner*—Steven R. Garland
*Attorney, Agent, or Firm*—Fliesler, Dubb, Meyer & Lovejoy

[57] ABSTRACT

The disk drive system includes an actuator, responsive to an adjustment value, for adjusting the position of a data head with respect to data tracks located on the surface of a disk, and a controller coupled to the data head and to the actuator. The controller receives servo information read from the surface of the disk by the data head. In turn, the controller determines an adjustment value to be applied to the actuator. The adjustment value is calculated dependent on a predetermined variable gain factor. Where the controller determines the position of the heat is oscillating about the center line of a predetermined data track at a frequency above a predetermined frequency, the controller reduces the gain factor applied in determining the adjustment value.

5 Claims, 8 Drawing Sheets

DISK DRIVE SERVO SYSTEM USING GAIN LIMITED HIGH-FREQUENCY TRACK-FOLLOWING COMPENSATOR

CROSS REFERENCE TO RELATED APPLICATIONS

The present application is related to the following Applications, all assigned to the Assignee of the present Application:

1. VOICE COIL ACTIVATED DISK DRIVE PARKING DEVICE WITH MAGNETIC BIAS, invented by Kurt Michael Anderson, application Ser. No. 269,573, filed Nov. 10, 1988, now U.S. Pat. No. 4,985,793.

2. DISK DRIVE SYSTEM USING MULTIPLE EMBEDDED QUADRATURE SERVO FIELDS, invented by Louis J. Shrinkle and John P. Squires, application Ser. No. 07/386,504, filed July 27, 1989.

3. DISK DRIVE SYSTEM EMPLOYING ADAPTIVE READ/WRITE CHANNEL CONTROLS AND METHOD OF USING SAME, invented by John P. Squires and Louis J. Shrinkle, application Ser. No. 07/420,371, filed Oct. 12, 1989.

BACKGROUND OF THE INVENTION

1. Field of the Invention

The present invention is directed to an improved control system for controlling the head of a disk drive in track-following and, in particular, to a high sample frequency track-following compensator control system for improving the accuracy of track-following while reducing the manufacturing cost of such system.

2. Description of the Related Art

The reliability of a disk drive in storing and retrieving information is largely dependent on the accuracy by which a data head may be aligned with a data track while reading or writing data. One technique for maintaining alignment between the head and track is to embed servo information fields in the data track. The servo information fields are provided with servo bursts that allow the position of head to be located relative to the center line of the data track. As the disk spins, the servo information fields can be read resulting in a periodic sampling of servo information. An adjustment to the position of the head can then be determined and applied. The correction is typically applied as a current to an actuator motor. Each head, of potentially many heads, is coupled to a respective load beam by a flexure that is in turn connected to the actuator body and motor, thus allowing control over the position of the head. The intended consequence of each position adjustment is to move the head toward alignment with a predetermined data track's centerline. These adjustments are, however, effectively applied as a fixed force for the duration of the period of the sample frequency.

The position of the head may thus oscillate about the center line of a track as a consequence of drifting past the center line between position corrections. The effective frequency of such head oscillations is dependent on the positional amplitude of the head about the track center line and the rate of position correction, which is in turn dependent on the sample rate of the servo information fields.

Consequently, a problem has been found to exist when a head assembly has a resonant frequency that is within or is a multiple of a frequency within the sample frequency of the servo information fields. The resonance of concern arises from the fact that the head, load beam and flexure are to a certain degree flexible in a plane parallel to the surface of the disk. Naturally, the resonant frequency is primarily dependent on the stiffness of the load beam and flexure in that plane, the mass of the load beam and head, and the length of the load beam.

Given the goal of fast position correction and that position corrections are periodic at the servo information field sample rate, overshoot of the track center line will inevitably occur. That is, as the head settles into following along a single track, it may begin to repeatedly and increasingly overshoot the track centerline. As this oscillation approaches the resonant frequency of the load beam and head, the head may actually be thrown completely off track, or at least sufficiently off track to compromise the reading and writing of data to the disk until the position i corrected.

A natural approach to increasing the resonant frequency of the head assembly is to increase the mechanical stiffness of the load beam. The flexure is not easily subject to stiffening given its primary goal of readily allowing the head to float on the air bearing layer that forms on a spinning disk surface. The head itself is quite stiff given its normally ceramic composition.

A conventional method of stiffening the load beam involves adhering a metal strip along the length of the load beam. Unfortunately, this solution necessitates additional precision construction steps in the manufacture of the head assembly. Typically, this results in an approximately one dollar per head assembly additional cost. Consequently, the cost, complexity and difficulty of precision manufacture of the head assembly is significantly increased. Further, the likelihood of failure over time is increased. In addition, the actuator's maximum position correction acceleration rate may be reduced by some degree due to the cumulative increased mass of the load beams.

SUMMARY OF THE INVENTION

Therefore, the general purpose of the present invention is to provide a high performance embedded servo disk drive control system that exhibits reduced sensitivity to resonance in the arm and head assembly.

This is accomplished in the present invention by providing a disk drive system including an actuator, responsive to an adjustment value, for adjusting the position of a data head with respect to data tracks located on the surface of a disk, and a controller coupled to the data head and to the actuator. The controller receives servo information read from the surface of the disk by the data head. In turn, the controller determines an adjustment value to be applied to the actuator. The adjustment value is calculated dependent on a predetermined variable gain factor. Where the controller determines the position of the head is oscillating about the center line of a predetermined data track at a frequency above a predetermined frequency, the controller reduces the gain factor applied in determining the adjustment value.

Thus, an advantage of the present invention is that it minimizes resonance induced off-track conditions.

Another advantage of the present invention is that it permits selective adaptation of the servo control loop to maximize track seeking responsiveness while approaching an on-track condition, yet maximizing the reliability of on-track track-following.

Yet another advantage of the present invention is that it substantially reduces the manufacturing cost of high sample rate embedded servo disk drives while at least maintaining product reliability.

Still another advantage of the present invention is that it obtains all of the above advantages without requiring any essential hardware modifications.

BRIEF DESCRIPTION OF THE DRAWINGS

These and other advantages and features of the present invention will become apparent when considered in conjunction with the following detailed description of the present invention and the drawings, wherein like reference numerals designate like parts throughout the figures thereof, and wherein.

DETAILED DESCRIPTION OF THE INVENTION

Figure 1:
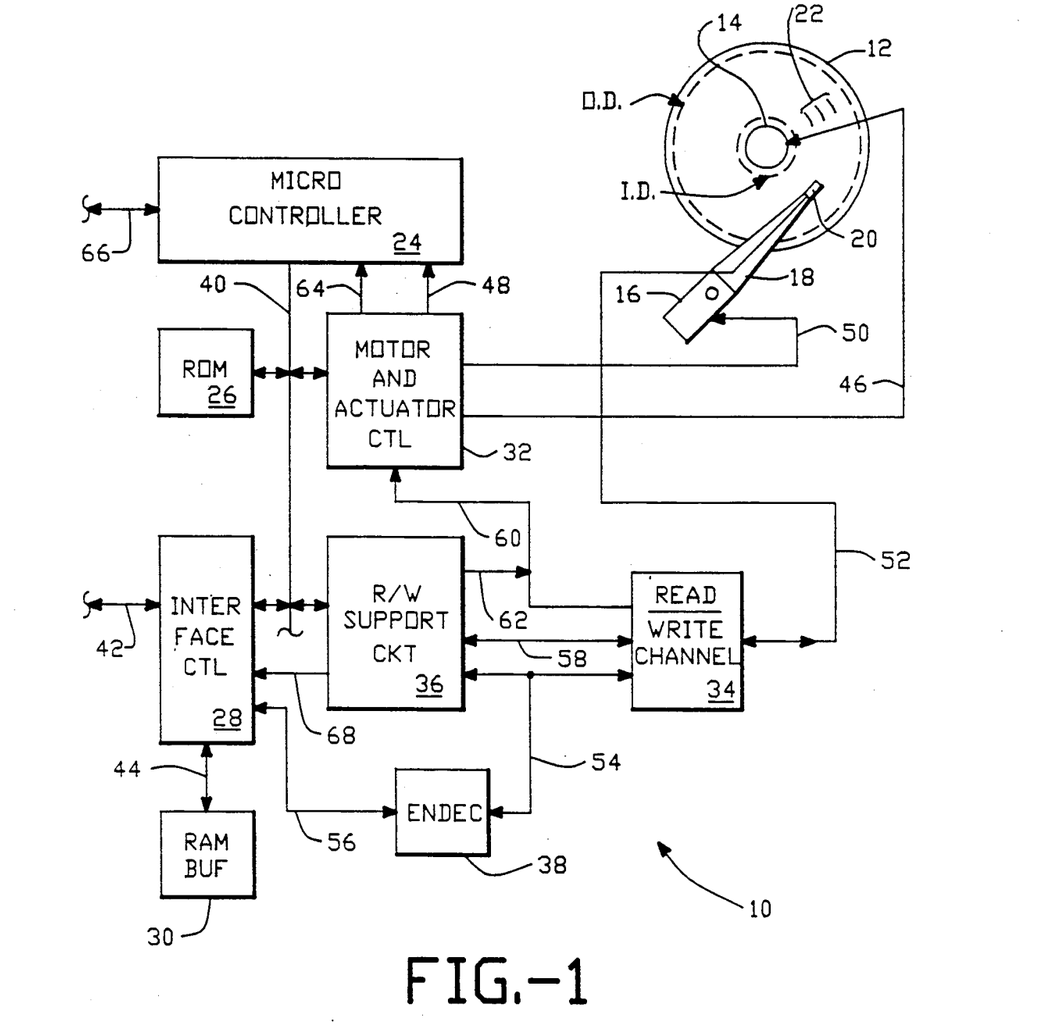
FIG. 1 is a simplified block diagram of a disk drive control system consistent with the present invention.

A disk drive system consistent with the principles of the present invention, generally indicated by the reference numeral 10, is shown in FIG. 1. The preferred embodiments of the present invention utilize an embedded microcontroller control system to manage and direct all essential functions of the mechanical aspects of the disk drive system. The drive system includes one or more disks 12 spun in parallel planes by a spindle motor 14. Data is stored in a data track band on each surface of a disk 12 defined by an outer (OD) and inner (ID) track diameter. An actuator assembly 16, including a load beam 18 and read/write head 20 per data surface, is utilized to transfer data with respect to concentric data tracks 22 within the track band. Thus, the primary control aspects of the system 10 include controlling the spin rate of the spindle motor 14 and the control of the actuator assembly 16 in positioning of the read/write heads 20 for the transfer of data with respect to selected data tracks.

A microcontroller 24, by utilizing a minimum number of dedicated control support circuits, directly implements all of the primary functions of the drive system 10. The electronic architecture of the present invention is described in detail in the above-identified co-pending related applications and are incorporated herein by reference. However, for purposes of completeness, the pertinent portions of the disclosures are set forth below.

In the preferred embodiments of the present invention, the microcontroller 24 is a three megahertz clock rate Motorola MC68HC11 HCMOS single chip microcontroller, as described in the MC68HC11A8 HCMOS Single Chip Microcomputer Technical Data Book (ADI 1207) available from Motorola, Inc., Motorola Literature Distribution, P.O. Box 20912, Phoenix, Ariz., 85036.

A read-only memory (ROM) 26 is coupled to the microcontroller 24 by way of a general purpose data, address and control bus 40. The ROM 26 is utilized to store a microcontroller control program for supporting five principle tasks necessary to implement the full functionality of the disk drive system 10. These tasks include interface, actuator, spin motor, read/write and monitor.

An interface control circuit 28 is provided to support the microcontroller 24 in execution of the interface task. The interface controller 28, in a preferred asynchronous SCSI embodiment of the present invention, is implemented as a Cirrus Logic CL-SH250 Integrated SCSI Disk Controller, manufactured and distributed by Cirrus Logic, Inc., and described by their CL-SH250 Technical Data Sheet, available from Cirrus Logic, Inc., 1463 Centre Pointe Drive, Milpitas, Calif. 95035. A comparable synchronous SCSI interface controller, the AIC-6110, is available from Adaptec, Inc., 691 South Milpitas Boulevard, Milpitas, Calif. 95035. A functionally equivalent interface controller, suitable for interfacing to the IBM Personal Computer Model "AT" peripheral bus, is also available from Cirrus Logic, Inc.

The interface controller 28, in general, provides a hardware interface between the disk drive system 10 and a host computer system, typically a data processing system, via a communications bus 42. The interface controller 28 utilizes a random access memory (RAM) buffer 30, accessible by a local data and control bus 44, to buffer data and commands received from or awaiting delivery to the host computer system. In this manner, the interface controller 28 is the primary manager of the bidirectional data stream between the communications bus 42 and the system 10 by way of the bus 40.

A motor and actuator controller 32 is provided as an internal interface between the microcontroller 24, the spin motor 14, and the actuator assembly 16. The controller 32 directly supports the commutation of the spin motor 14 by selectively providing commutation current to the motor 14 via the lines 46. Commutation state selection is effected by provision of a digital word from the microcontroller 24 to a commutation control latch within the controller 32. This word is used to select the field winding phase pair of the spin motor 14 that is to receive commutation current when commutation is enabled. The commutation current is switched by the controller 32 on to corresponding pairs of commutation current lines of the lines 46. A second control word, also latched by the controller 32, is used to enable the provision of commutation current.

A voltage proportional to the current conducted through the selected field winding phase pair of the spin motor 14 is provided as a current feedback voltage level, on line 48, to an analog-to-digital converter input of the microcontroller 24.

To control the actuator assembly 16, the controller 32 provides for the latched digital-to-analog conversion of a digital actuator position control word. The controller also provides voltage-to-current buffering of the resultant analog voltage. This output current is then provided on line 50 to the voice coil motor of the actuator assembly 16. The digital position control word, as provided via the bus 40 from the microcontroller 24, represents the desired actuator position. A second digital word may be written to a control register within the controller 32 to enable conversion of a newly presented digital position control word by the digital-to-analog converter.

A read/write channel controller 34, in combination with the interface controller 28, a read/write support circuit 36 and an encoder/decoder (ENDEC) 38, similarly acts as an internal control interface between the microcontroller 24 and the read/write heads 20 of the actuator assembly 16. The channel controller 34 buffers raw data transferred between the head 20, via the raw data lines 52, and the interface controller 28, via line 54, the ENDEC 38 and line 56. Raw data is also provided to the read/write support circuit 36, via line 54.

The operation of the read/write channel controller 34 is controlled by the read/write support circuit 36 via control lines 58. These control signals include servo burst gating signals for routing the received raw data, corresponding to each of four servo bursts, onto raw peak detector signal lines 60. These raw peak signals are provided through the motor and actuator controller 32, for sample-and-hold buffering, and onto lines 64 to respective analog-to-digital converter inputs of the microcontroller 24. The control lines 62 allow the read/write support circuit 36 to reset the sample-and-hold circuits.

The interface controller 28, in combination with the ENDEC 38, provides for the buffered serialization and deserialization and data clock encoding/decoding of data. However, the read/write support circuit 36, from the raw data received via line 54, is used to detect the sector mark and to acquire gray code data from each servo sector field embedded in the data tracks. A sector mark detect signal is provided via line 68 to the interface controller 28 to initiate any pending sector data processing.

Configuration and initiation of disk read/write functions by the interface controller 28 and read/write support circuit 36 are performed under the direct control of the microcontroller 24. That is, both of these controllers 28, 36 are programmable by the microcontroller 24.

The mechanical configuration of a disk drive embodying a preferred embodiment of the present invention is described in VOICE COIL ACTIVATED DISK DRIVE PARKING DEVICE WITH MAGNETIC BIAS and is incorporated herein by reference. The aspects of the mechanical structure pertinent to the present invention are set forth in Table 1 and Table 2 below.

TABLE 1

| Number Data Cylinders | 1368 cylinders |
|---|---|
| Sectors per Track | 39 sectors |
| Number of Disks | 4 |

TABLE 1-continued

| Number of Data Surfaces | 8 |
|---|---|
| Bytes per Sector | 662 bytes |
| Data Bytes per Sector | 512 bytes |
| Data Capacity per Data Surface | 27.3 Mbytes |
| Total Data Capacity | 219 Mbytes |

TABLE 2

| Disk Diameter | 96 millimeters |
|---|---|
| Data Track Band Width | 30 millimeters |
| Track Density | 1700 tracks/inch |
| Bit Density (max) | 22,000 fci |
| Head Width | 11 micrometers |
| Track Width | 15 micrometers |

Figure 2:
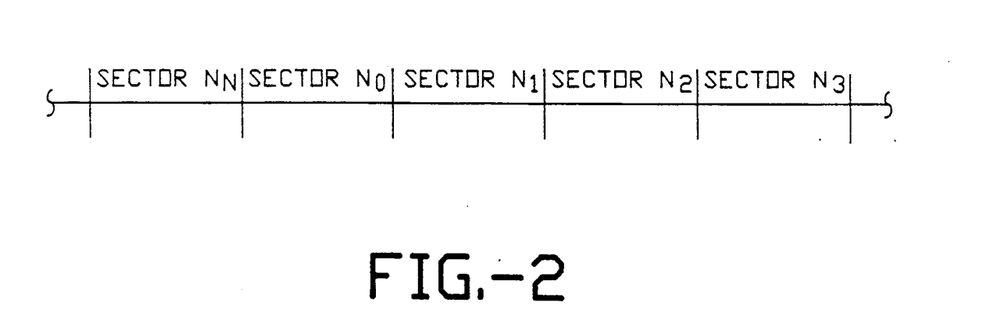
FIG. 2 is a simplified representation of a portion of a data track with the plurality of sectors provided thereon.
Figure 3A:
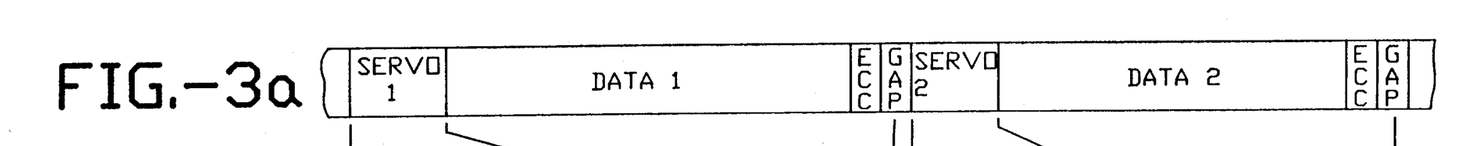
FIGS. 3a-3b illustrate the distribution of servo control information and data in a simple, exemplary sector as provided in accordance with the present invention.
Figure 3B:
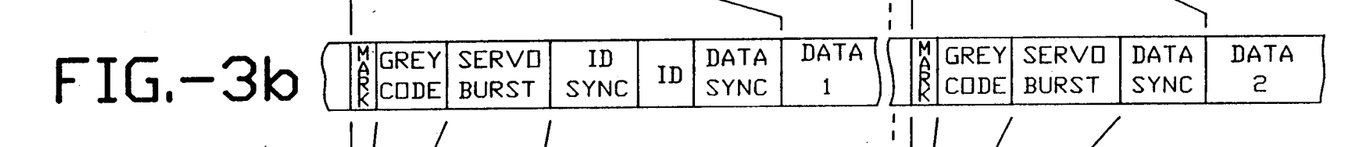

As generally represented in FIG. 2, each track of the concentric data tracks 22 provided on the surface of a disk 12 are further subdivided into sectors $N_{0-n}$. In accordance with the present invention, and as generally shown in FIG. 3a, each sector is composed of a servo 1 field, a data field, first error correction code (ECC) field, mid-sector gap field, servo 2 field, data 2 field, second ECC field, and final gap field. As shown in FIG. 3b, the servo 1 field is further composed of a servo mark field, gray code field, servo burst field, ID sync field, ID field, and data sync field. Similarly, the servo 2 field is composed of a second sector mark field, second gray code field, second servo burst field and finally, a second data sync field. The order and size of these fields are set forth in Table 3.

TABLE 3

| Half Sector "A" Field | Bytes | Half Sector "B" Field | Bytes |
|---|---|---|---|
| Servo Sync | 3 | Servo Sync | 3 |
| Gray Code | 8 | Gray Code | 8 |
| Servo Burst A | 4 | Servo Burst A | 4 |
| Servo Burst B | 4 | Servo Burst B | 4 |
| Servo Burst C | 4 | Servo Burst C | 4 |
| Servo Burst D | 4 | Servo Burst D | 4 |
| Pad | 1 | Pad | 1 |
| ID Sync | 12 | Data Sync | 12 |
| ID (Header) | 4 | Data | 267 |
| ID CRC | 2 | ECC | 7 |
| Pad | 4 | Gap | 17 |
| Data Sync | 12 | | |
| Data | 245 | | |
| ECC | 7 | | |
| Gap | 17 | | |
| 331 Bytes (1st half) | | 662 Bytes Total | |

The sector mark fields are provided to synchronize the microcontroller with the control information present in the remaining portions of the servo 1 and 2 fields as well as the data 1 and 2 fields. The gray code fields provide an unambiguously encoded track number. The unambiguous coding of the gray code values is further qualified in that the gray code values of like sectors on adjacent tracks differ by a single bit and that no more than two consecutive zero bits are allowed in a valid gray code value.

The servo burst fields, in accordance with the preferred embodiments of the present invention, are sequentially arranged burst fields of constant amplitude and constant frequency physically offset in a predefined pattern from the center line of the data sector.

The ID sync field of the servo 1 field is also written at constant frequency and voltage, though physically centered on the track center line. The ID sync field allows the read/write controller to distinguish the first bit of the ID field. The ID field is used to store the cylinder, sector, and head numbers.

Finally, the data sync fields are constant frequency and amplitude fields provided to define the first bits of the respective data fields 1 and 2. The read/write controller synchronizes to the frequency of the data sync field. The first discontinuity in the sync frequency is therefore taken as the first data representative transition.

Figure 4:
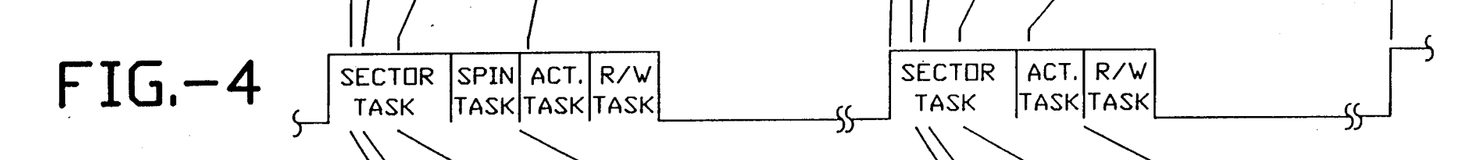
FIG. 4 illustrates the task management control system flow structure of the microcontroller of the present invention in processing the servo control information of the sector shown in FIGS. 3a-3b.

Referring now to FIG. 4, task execution as performed by the microcontroller 24 is shown mapped against the real time occurrence of the servo 1 and 2 fields with respect to a read/write head 20. The basic real time relations pertinent to the present invention are set forth in Table 4.

TABLE 4

| Disk Rotational Speed | 3550 rpm |
|---|---|
| Average Access Time | 19 millisecs. |
| Minimum Track-to-Track Transition Time | 28 microsecs. |
| Sector Period | 433 microseconds |
| Servo Sample Rate | 4.6 KHz |
| Time Over Burst (each) | 2.665 micorosecs. |
| Bytes Read per Track at Max Seek Rate | 43 bytes/track |
| Time over Gray Code | 5.33 microsecs. |

Specifically, a sector task is initiated in response to a countdown timer interrupt just prior to the occurrence of the servo field. From this interrupt, the microcontroller 24 enables the read/write support circuit 36 to detect and process the sector mark field. A control value is then provided to the spin motor and actuator controller 32 to commutate the spin motor 14.

Figure 5:
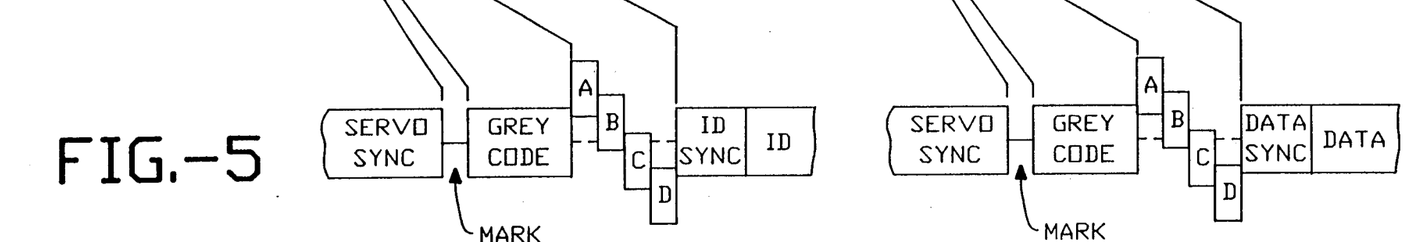
FIG. 5 illustrates the detailed presentation of the servo control information of the exemplary sector, shown in FIGS. 3a-3b, as provided in accordance with the present invention.

As shown in FIG. 5, the sector mark field is defined by the trailing end of the servo sync filled gap field and the sector mark. The gap field is another constant amplitude constant and frequency field. The sector mark is defined as the first read data transition following the absence of any servo sync transitions for three bytes of servo sync clock cycles. The time of occurrence of the sector mark is recorded by a hardware timer within the microcontroller 24 for use in subsequent tasks as well as scheduling the countdown timer interrupt necessary for processing the servo 2 field.

During the sector task, the gray code and sector bursts are captured by the read/write support circuit 30 via the line 54 as coupled to the read/write channel controller 36. An automatic gain control circuit (AGC) is provided in the controller 34 to adjust the amplitude of the raw data signal. In anticipation of the gray code and servo burst fields, the read/write channel controller 34 is enabled by the microcontroller 24, via the read/write support circuit 36, to boost the gain of the AGC to compensate for reduced signal amplitudes. Although the AGC would automatically adjust its gain, the response time of the AGC is enhanced by direct adjustment of its gain just prior to or at the beginning of the gray code field.

Capture of the gray code by the read/write support circuit 36, though also earlier enabled by the microcontroller 24 during the servo sync corresponding portion of the sector task, is triggered internally by the sector mark signal internally produced upon detection of the sector mark. Similarly, capture of the four servo burst fields is triggered following a pre-defined delay, equal to the gray code length, following detection of the servo mark. The actual capture of the analog read amplitudes corresponding to each of the servo burst fields is performed by four sample and hold circuits individually gated to match the real time occurrence of the respective servo burst fields.

Meanwhile, the microcontroller 24 completes the sector task and transitions to a spin motor control task. The primary function of the spin control task is to determine any rotational speed error of the spin motor 14 based on the previous actual and expected time of occurrence of the sector mark. A spin rate adjustment value may then be determined for use in the next servo 1 field sector task.

Next, an actuator task is executed by the microcontroller 24. This task is generally initiated subsequent to the A/D conversion of the servo burst fields. The first action undertaken by the microcontroller 24 in execution of the actuator task is to determine whether an actuator seek operation is pending or an off-track error was prior determined. In either case, execution continues with a setup of a corresponding seek operation for subsequent execution. If, however, track-following is to be performed, the four servo burst corresponding digital values are processed by the microcontroller 24 to derive a quadrature servo burst track-following error value ($P_0$) Assuming that the B and C servo burst fields, as shown in FIG. 5, overlap the center line of the current data sector (known by whether the current track number is odd or even), the quadrature processing of the servo burst field values is done in accordance with Equation 1:

$$P_0 = (A+B) - (C+D) \qquad Eq. 1$$

Although all four bursts are present and available for use, an alternative is to use, per Equation 2, only the two bursts that overlap the track center line during normal track-following while using all four bursts during seeking.

$$P_0 = (B-C) \qquad Eq. 2$$

Where the A and D sector bursts overlap the center line of the current data sector, i.e., every other track, the quadrature processing is performed in accordance with Equation 3 or, in the alternative, Equation 4:

$$P_0 = (C+D) - (A+B) \qquad Eq. 2$$

$$P_0 = (D-A) \qquad Eq. 4$$

A positive track-following error result is interpreted to indicate that the read/write head needs to be moved toward the inner diameter of the disk 12. The magnitude of the result gives an indication of the distance to the track center line. Thus, the microcontroller 24 may readily compute an error adjustment value based on the polarity and magnitude of the quadrature derived track-following error. The error adjustment value is combined with the current actuator position control value and written to the digital-to-analog converter of the motor and actuator controller 32. The adjusted analog actuator position control signal thereby produced results in a corrective change in the position of the actuator assembly 16 and the head 20 relative to the current data track.

The microcontroller 24 may then transition to a read/write task. Execution of the read/write task provides for the set-up, continuance, or completion of the transfer of data with respect to the current data sector.

Finally, any pending seek operation is executed by the microcontroller 24 just prior to the conclusion of the read/write task. In general, the seek operation selected during the actuator task determines an actuator position value to initiate, continue, or complete a seek operation of the actuator assembly 16. The read/write task then completes with the execution of a return from interrupt instruction.

The sector task of the servo 2 field is initiated in response to the countdown timer interrupt as scheduled in the servo sector task. The microcontroller 24 then executes sector, actuator, read/write and seek tasks that are substantially identical to their counterparts executed with respect to the servo 1 field, including scheduling the count down timer interrupt for the next sector's servo 1 task start.

The balance of the sector period not otherwise spent processing the servo 1 and servo 2 fields is used to execute the interface task and, if active, the monitor task. Thus, the microcontroller 24 operates as an essentially multi-tasking processor in the control and management of the disk drive system 10.

Figure 6:
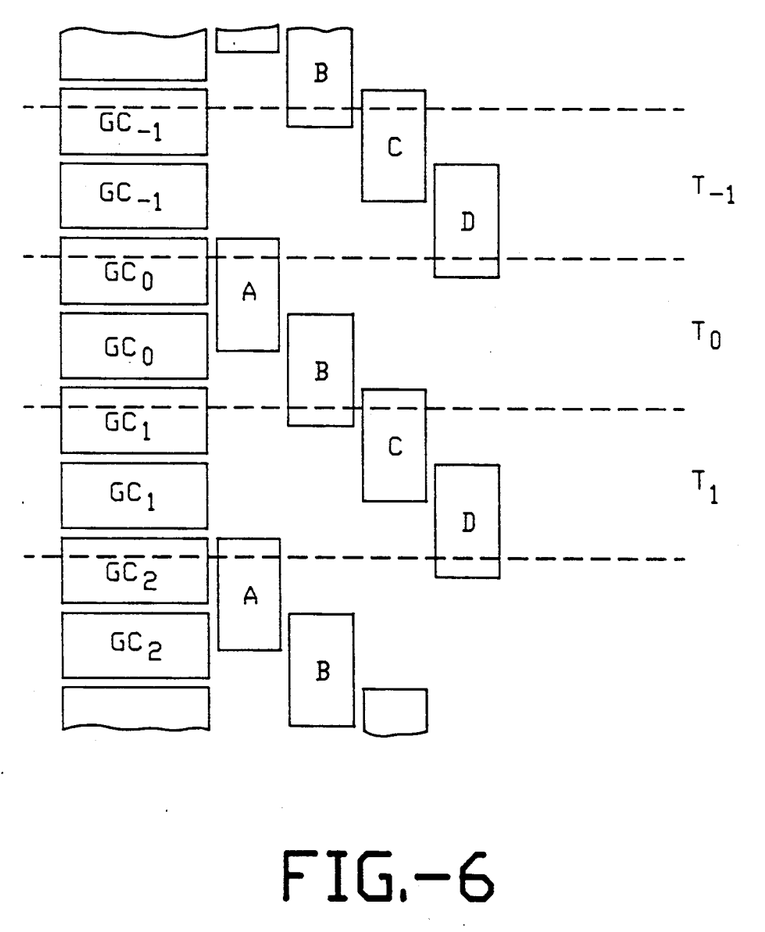
FIG. 6 is a detailed representation of the distribution of gray code and servo burst fields over a number of representative data tracks as provided in accordance with the present invention.

The gray code and quad-servo burst pattern of the present invention is illustrated in FIG. 6. A portion of the servo fields of sectors on adjacent tracks is shown. The near continuous band of gray code is shown as the fields $GC_{-1}$ through $GC_{+2}$. The individual gray code fields are separated by gaps due to a phenomenon known as overlap erasure. This phenomenon is a consequence of the overlapping writing of the fields to the disk surface. A fringe field created at the borders of the read/write head when writing data to the disk surface will erase any pre-existing data for the width of the fringe field. For conventional read/write head voltages during writing, the overlap erasure width will range from between 100 and 160 microinches. While there is, therefore, a loss in recorded surface area carrying gray code information, the gray code fields of the present invention are written across the entire track width to form an effectively continuous gray code field band. Further, as previously noted, the gray code itself is chosen to encode the necessary information while differing as between the same sector on adjacent tracks by only a single bit. Consequently, even while seeking at high speed across the data tracks, an apparent gray code field read that captures a first portion of the gray code associated with one track and the remainder of the gray code field from an adjacent track will still generally yield an identification of the correct track number.

Also illustrated in FIG. 8 is the quad-servo burst pattern characteristic of the preferred embodiments of the present invention. Each servo burst is independently written with a radial offset of one-half track width from the previous burst. The read/write head width, in accordance with the preferred embodiments of the present invention, is greater than or equal to sixty percent (60%), but less than one hundred percent (100%) of the track width. Consequently, each servo burst overlaps its two radially-nearest servo bursts by less than one-half of a head width. The burst overlap, in terms of track width, is given as:

$$\text{Burst Overlap} = H - \frac{T}{2} \qquad \text{Eq. 5}$$

where H is the head width and T is the track width.

As illustrated in FIG. 6, a unique characteristic of the servo bursts as implemented in the preferred embodiments of the present invention is that none of the servo bursts are disposed symmetrically across the track center line of a data track. The servo bursts are servo track-written at one-half track offsets. However, the servo track-written tracks do not align with the data tracks that are subsequently used to store user data. Rather, as shown in FIG. 8, pairs of servo bursts, such as A and B with respect to track $T_0$ (and $T_{+2}$) and bursts C and D with respect to track $T_1$ (and $T_{+1}$), will overlap a track center line. The overlap is asymmetric with respect to the individual servo bursts but, with respect to the pair, displays a symmetric offset to either side of the data track center line. The other two servo bursts of a set of quad-servo burst fields are similarly offset in mirror symmetry from the same data track center line. The pattern of servo bursts repeats every other data track. However, the information content of the quadservo burst field, and gray code fields, is the same for every data track.

The present invention provides for a track-following compensator algorithm that maintains its on-track track-following accuracy while selectively reducing the opportunity for head assembly resonance. This track-following algorithm is premised on the implementation of Equation 6 as the essential on-track track-following control function implemented in firmware and executed in the actuator control task.

$$O = (G^* P_{ant}^* r) + k \qquad \text{Eq. 6}$$

where:
O is the actuator position adjustment value,
G is a gain constant,
$P_{ant}$ is the anticipated next head position correction term,
r is a gain reduction factor between 1 and 0.01, and
k is a substantially constant track reference value,
and where:

$$P_{ant} = (P_0 - P_{-1}) + P_0/n \qquad \text{Eq. 7}$$

where:
$P_0$ is the current position of the head,
$P_{-1}$ is a prior value of the current position of the head, and
n is a constant between 1 and 100.

Figure 7A:
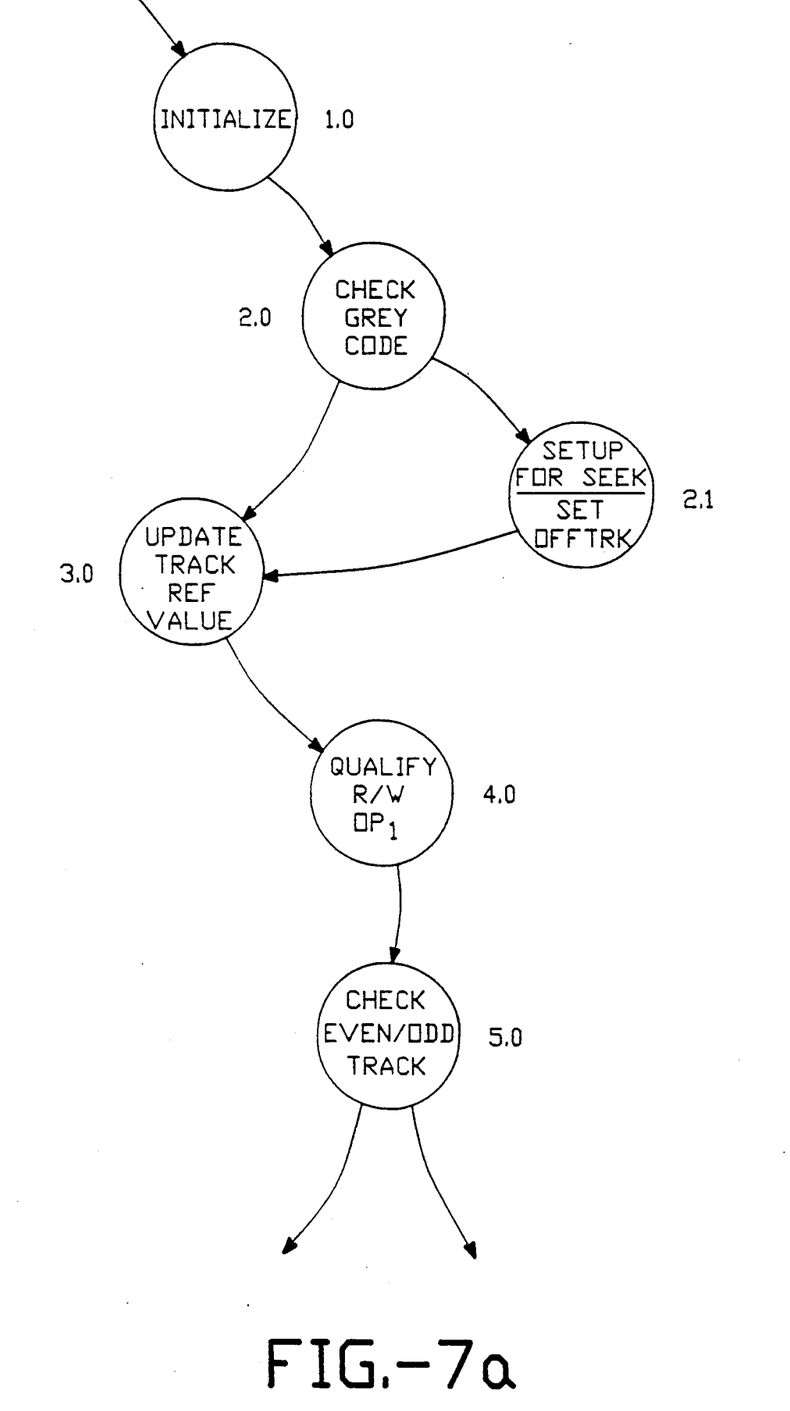
FIGS. 7a-7c is a combined data and structure flow representation of the actuator track-following compensator algorithm as implemented in a preferred embodiment of the present invention.
Figure 7B:
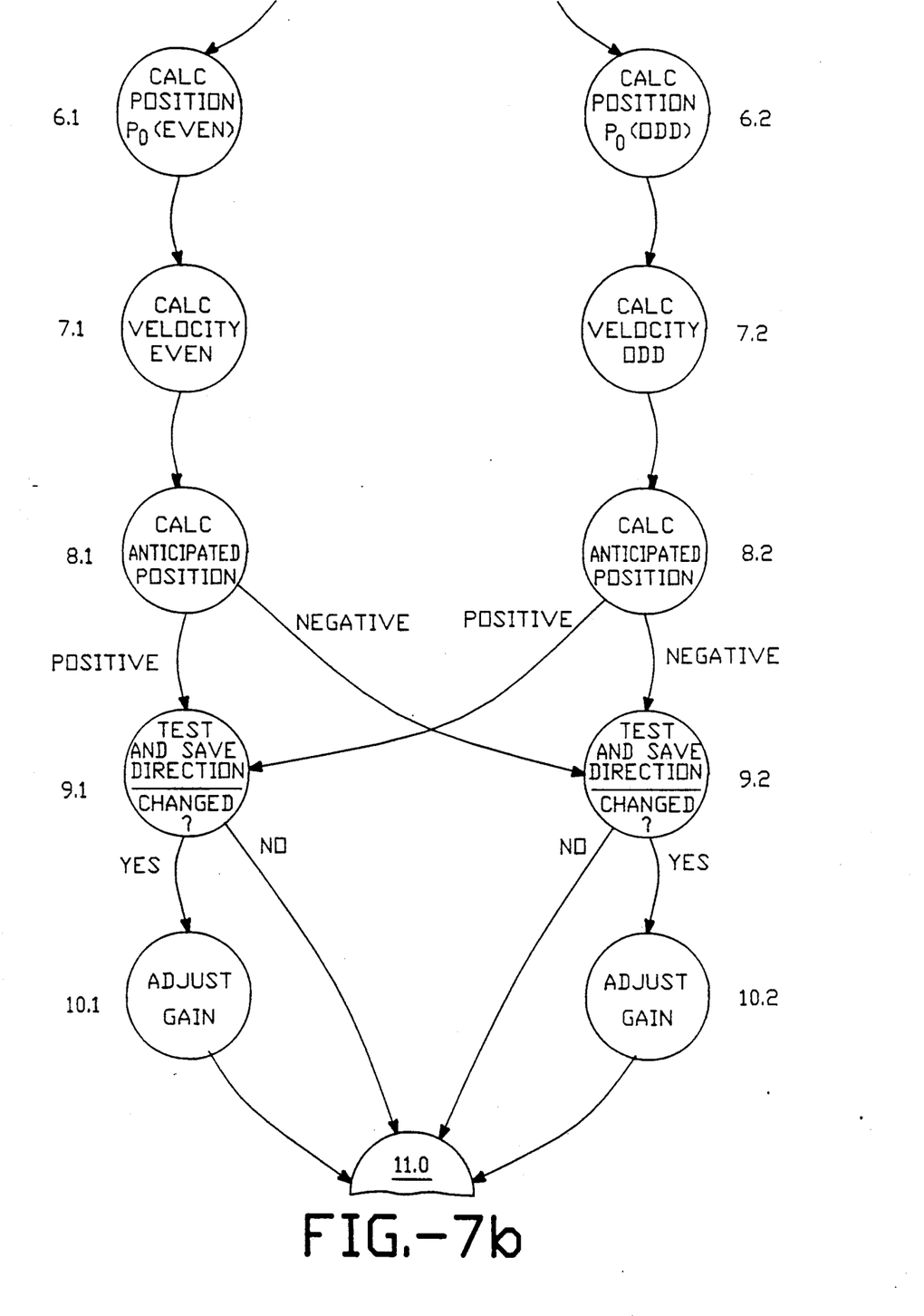
Figure 7C:
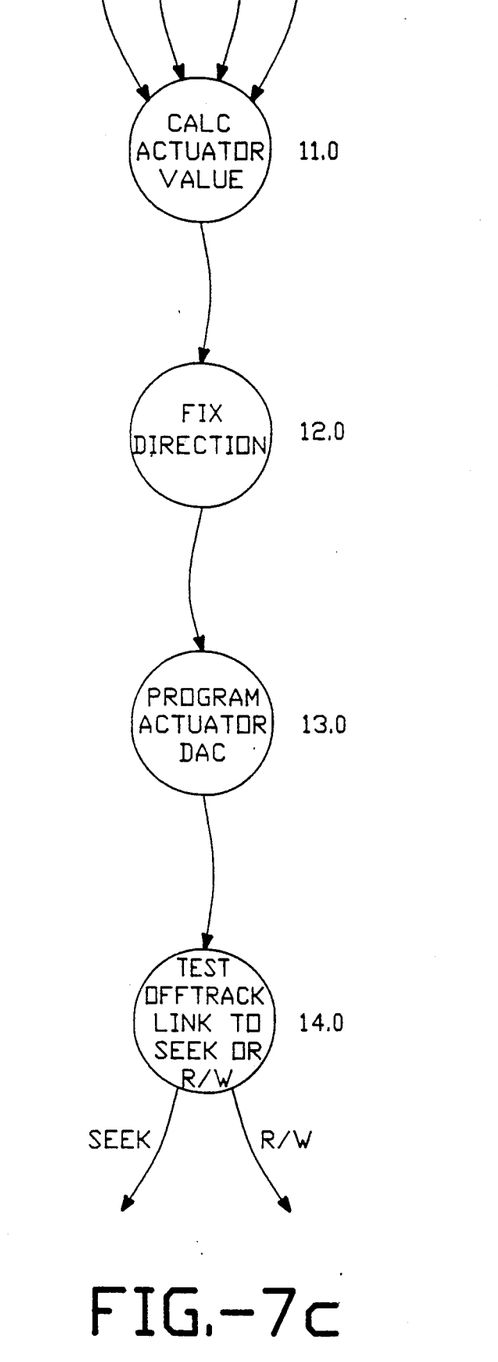

The implementation of Equation 6 as the track-following compensator algorithm of the present invention is represented in FIGS. 7a-7c as a combined control structure and flow diagram. The compensator algorithm begins at a state 1.0 with the initialization of the compensator algorithm program variables. In a state 2.0 the gray code value, enabled for capture during the earlier sector task, is checked against an anticipated gray code value. If the values match, the algorithm execution transitions to a state 3.0. However, since the gray code encodes a track identifier value, a failure of the values to match results in a transition to an error-handling state 2.1. There, a flag is set to indicate that the head is in an off-track position and that a seek operation is required to return the head to the desired track. The state 2.1 execution then transitions to state 3.0. In state 3.0, the current track's track sub-band reference value is obtained and updated to a value equal to the running average of the off-track offset while track-following.

A transition to state 4.0 is then made. Here, the algorithm determines whether a read or a write operation is pending and whether the operation may be performed depending on whether the head is adequately on-track. Flags are set for use in the subsequent read/write task.

At state 5.0, the compensator algorithm determines whether the current track is even or odd. That is, due to the utilization of the preferred embodiment of the present invention of the quad servo burst format, processing of the servo bursts to determine the off-track position of the head differs as to whether the head is following an odd- or even-numbered track. In order to preclude the necessity of repeatedly retesting whether the head is following an even or odd track, the compensator algorithm of the present invention provides for parallel execution paths, beginning with the states 6.1 (even) and 6.2 (odd). In state 6.1, the current position of the head is determined by utilizing Equation 1 or, in the preferred embodiment of the present invention, Equation 2. Analogously, in state 6.2, Equation 3 or, in the preferred embodiment of the present invention, Equation 4 is utilized to calculate the current position of the head relative to the track center line.

In states 7.1 and 7.2, the prior stored value of the head position is utilized to effectively calculate the velocity of the head. That is, the difference in the present off-track position, $P_0$, and the prior off-track position, $P_1$, given that the positions are periodically determined, effectively yields a velocity value.

Figure 8A:
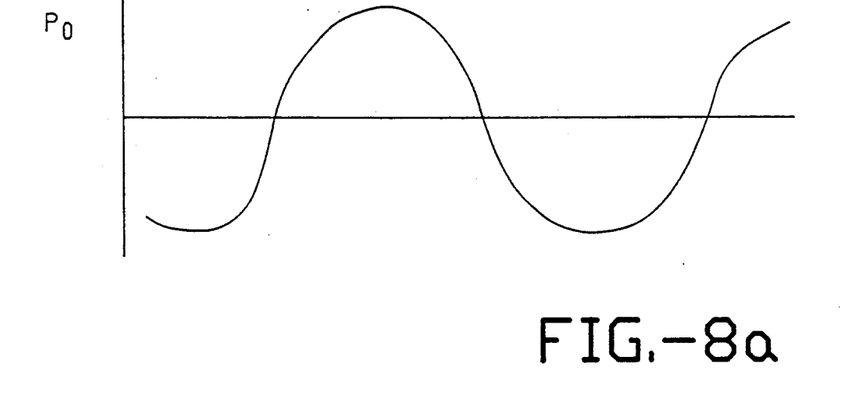
FIGS. 8a-8c are graphs of calculated values utilized in the execution of the preferred embodiment of the present invention.
Figure 8B:
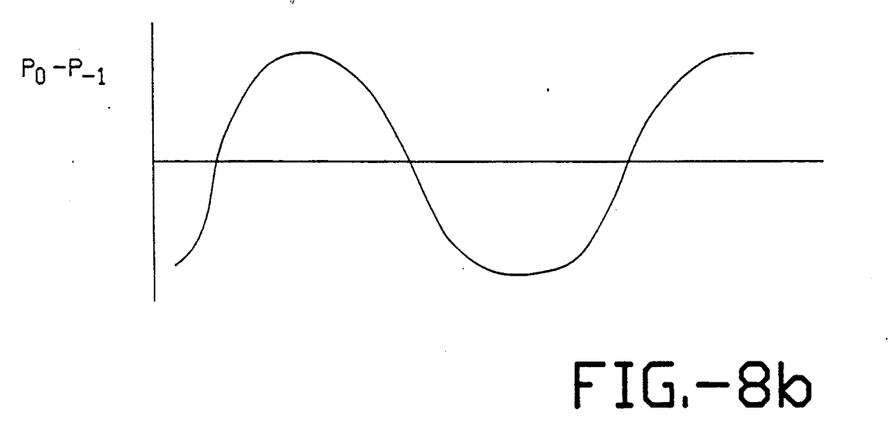

In states 8.1 and 8.2, Equation 7 is utilized to calculate an anticipated head position correction term. A better understanding of Equation 7 can be had by reference to FIGS. 8a–c. In FIG. 8a, a hypothetical track-following path of the head is graphed as position $P_0$ with respect to time. The velocity, or $P_0 - P_{-1}$, is shown in FIG. 8b. As should be readily apparent, each point on the graph in FIG. 8b effectively leads the time corresponding point in the graph of FIG. 8a.

Figure 8C:
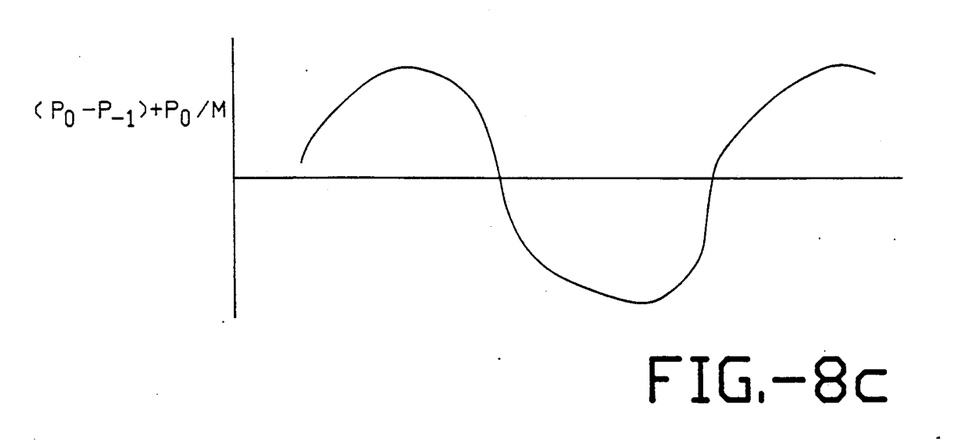

FIG. 8c provides a graph of the result of Equation 5. The fractional current position term, $P_0/n$, modifies the graph of FIG. 8b to accentuate the apparent velocity of the head as it approaches the track centerline. By increasing the value of n, the correction term $P_{ant}$ becomes more sensitive to the head velocity and less sensitive to the actual current position error of the head.

Referring again to FIG. 7b, the anticipated position correction value provided by Equation 5 is used to determine the transitions to the next states 9.1 and 9.2. Positive values result in transitions from states 8.1 and 8.2 to state 9.1. Conversely, negative values result in a transition to state 9.2. In states 9.1 and 9.2, the anticipated position correction values are utilized to determine whether the direction of travel of the head, relative to the track center line, is anticipated to change. A stored flag representing the prior anticipated direction of travel is utilized to determine whether there will be a change in direction. The currently anticipated direction is then stored by the flag. If there is a change in anticipated direction, transitions are made to states 10.1 and 10.2 from states 9.1 and 9.2, respectively. The states 10.1 and 10.2 effectively apply the gain factor adjustment value r to the anticipated position correction value, $P_{ant}$.

A transition from state 9.1, 9.2, 10.1 or 10.2 to a common state 11 is then made. As shown in FIG. 7c, the common state 11.0 provides for the final calculation of an actuator control value, expressed as a digital word, based on the output of Equation 6. In state 12.0, the polarity of the output value of Equation 6 is utilized to select the actuator correction direction. In state 13.0, the actuator control word and direction values are effectively provided to the actuator controller.

Finally, in state 14.0, the off-track flag is tested to determine whether a seek operation is to be initiated with the next actuator task execution. If not, the read/write qualification flag is tested to determine whether a read/write operation is pending and properly qualified to be executed. If there is, the read/write task is executed.

In order to better appreciate the implementation of the present invention, states 5–13 are presented, in a pseudo-code representation, in Table 5.

TABLE 5

```
;==========================
;Actuator track-following compensator algorithm
;==========================
TRAK10:
    branch to TRAK20 if on odd track
    calc P0                    ;from burst values
    get P-1
    save P0                    ;as P-1 for next
                               ; iteration
    calc V = P0 - P-1
    calc Pant0 = V + (P0/6)
    branch to TRAK30 if Pant0 is negative
TRAK12:
    get gain G                 ;apply gain to positive
                               ; values
    branch to TRAK14 if Pant-1 was positive
    flag that Pant0 is positive
    calc Pant0 = Pant0/4       ;effectively reduce gain
TRAK14:
    calc O = G*Pant0
    goto TRAK40
TRAK20:
    calc P0                    ;from burst values
    get P-1
    save P0                    ;as P-1 for next
                               ; iteration
    calc V = P0 - P-1
    calc Pant0 = V + (P0/6)
    branch to TRAK12 if Pant0 is positive
TRAK30:
    get gain G                 ;apply gain to negative
                               ; values
    branch to TRAK32 if Pant0 was negative
    flag that Pant0 is negative
    calc PantO = Pant0 /4      ;effectively reduce gain
TRAK32:
    compliment Pant0           ;handle negative
    calc O = G*Pant0           ; multiplication
    compliment O
TRAK40:
    flag that O is positive    ;default direction
    calc O = O + k             ;add reference value k
    branch to TRAK42 if O is positive
    flag that O is negative    ;actual direction
    compliment O
TRAK42:
    save O to Actuator DAC
    save direction to Actuator
    control register
;==========================
```

Figure 9A:
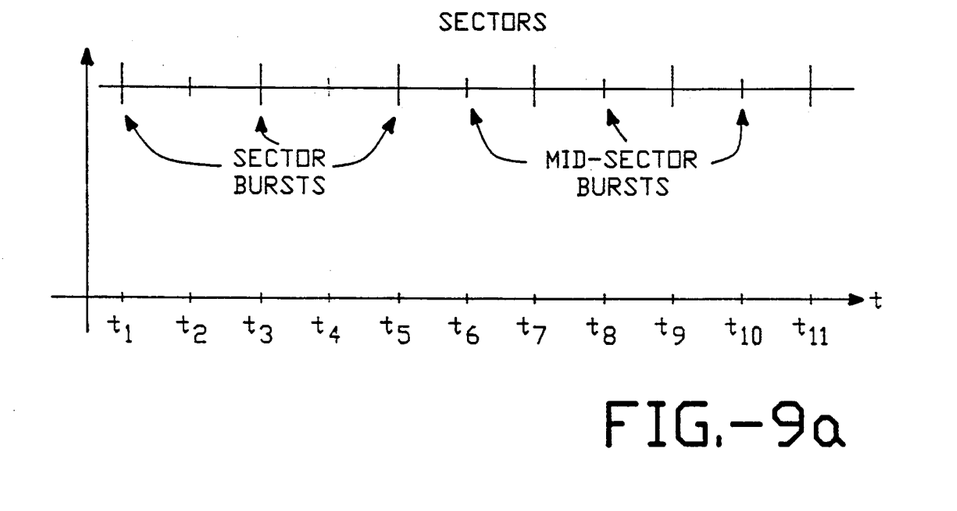
FIGS. 9a-9c illustrate the operation of the present invention in controlling the on-track track-following oscillation of an arm and head assembly in accordance with the preferred embodiment of the present invention.
Figure 9B:
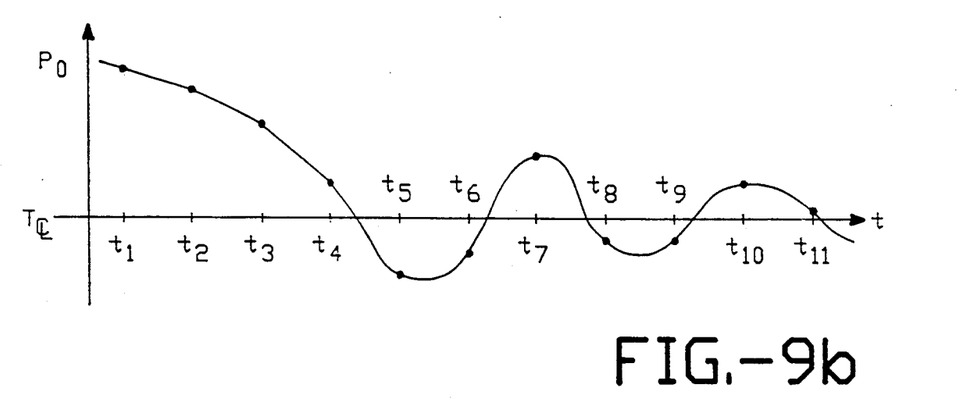
Figure 9C:
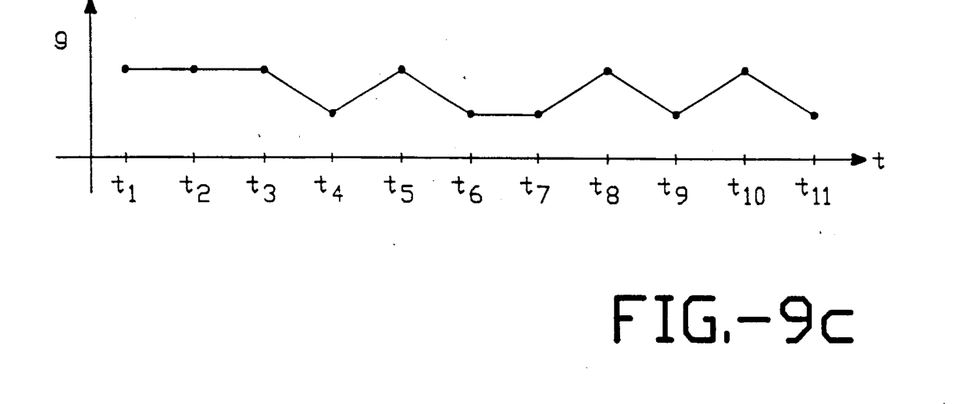

FIGS. 9a–c illustrate the operation of the present invention in reducing the occurrence of actuator arm resonance. FIG. 9a graphically depicts a section of a track. The sector bursts, including both those located at the beginning and midpoint of the sectors, are marked in time. FIG. 9b, directly corresponding in time to FIG. 9a, illustrates the position, $P_0$, of the head as it closes toward the center line of the track. Finally, FIG. 9c, also directly correlated in time to FIGS. 9a and 9b illustrates the sample-to-sample variance of the net gain factor, $G * r$, in accordance with the execution of the track-following compensator algorithm of the present invention.

As the head position $P_0$ translates toward the track center line, between times $t_1$ through $t_3$, the gain factor remains at its standard value. However, at $t_4$, the anticipated position correction value from Equation 7 is negative, indicating an anticipated crossing of the track center line. Consequently, at $t_4$, the gain of the compensator algorithm is reduced.

At $t_5$, an overshoot of the track center line occurs. However, since the anticipated position correction value from Equation 7 remains negative at $t_5$, the gain factor is increased to its standard value.

At $t_6$, the anticipated head position correction value changes polarity. Thus, the gain factor is reduced in computing the compensator algorithm's output value. Similarly, at $t_7$, another track center line crossing is anticipated and the reduced gain factor is used.

The use of the reduced gain factor, at $t_6$ and $t_7$, has two immediate consequences. The degree of track center line overshoot and the velocity of the head as it crosses the track centerline are both reduced as a function of the reduced correction force produced by the actuator. Thus, while the off-track position error is being reduced, the present invention further provides for a reduction in the frequency of track center line crossings.

It has been determined that the resonant frequency of head assemblies conventionally available for use in the preferred 3.5 inch form factor disk drive embodiments of the present invention is at about 2 kiloHertz. It should also be apparent that there are two track centerline crossings per cycle of the head about a track center line. Consequently, the maximum head frequency could be as high as 2.3 kiloHertz, based on the 4.6 kiloHertz servo sample frequency of the preferred embodiment.

However, the consequences of reducing the compensator gain where a track crossing is anticipated generally prevents the head frequency from reaching two kiloHertz. That is, so long as the reduction of compensator gain results in more than 2.3 servo samples per cycle of the head about the track center line, the head frequency will not reach the resonant frequency of the head assembly. In the preferred embodiment of the present invention, a gain reduction factor of four realizes an average of 3.4 servo samples per cycle of the head about the track center line. Such is graphically shown in FIG. 9b between time $t_7$ and $t_{11}$.

Consistent with the present invention, a smaller gain reduction factor, i.e., a factor of 3, could be used. The compensator's speed of correcting off-track errors would be increased, but the contribution to the off-track position due to near-resonance oscillations of the head assembly would increase. Similarly, a larger gain reduction factor would reduce the contribution to the off-track errors due to near-resonance oscillations, but would tend to degrade the responsiveness of the track following algorithm in correcting ordinary off-track errors. It can therefore be seen that the present invention is effective in reducing the frequency of occurrence of track center line crossings while settling into close center line track-following, yet capable of being tailored so as to not affect the accuracy of on-track track-following.

Thus, a system and method providing for high-sample frequency embedded servo track-following and a track-following algorithm that substantially prevents head assembly resonance during on-track track-following has been disclosed.

As should be readily apparent from the foregoing disclosure, many modifications and variations of the present invention are possible in light of the above description of the preferred embodiments. It is therefore to be understood that, within the scope of the appended claims, the present invention may be practiced otherwise as specifically described herein.

I claim:

1. A disk drive comprising:
   a) means, responsive to an adjustment value, for adjusting the position of a head with respect to data tracks located on the surface of a disk;
   b) means, coupled to said head, for reading servo information from the surface of said disk;
   c) means, coupled to said adjusting means, for determining said adjustment value, said adjustment values being determined dependent on a gain factor, said determining means being coupled to said reading means to receive servo information indicative of the position of said head relative to the center line of a predetermined data track, said determining means determining whether the position of said head is oscillating about the center line of said predetermined data track at a frequency above a predetermined frequency by determining a present position of said head relative to the centerline of said predetermined data track and an anticipated position correction term for said head relative to the centerline of said predetermined data track and further determining whether said present position and said anticipated position correction term are effectively on complementary sides of the centerline of said predetermined data track, said determining means reducing said gain factor applied in determining said adjustment value when said head is oscillating about the centerline of said predetermined data track at a frequency above said predetermined frequency.

2. The disk drive of claim 1 wherein servo information is stored in multiple locations on said predetermined data track and wherein said determining means determines said adjustment value for each occurrence of said servo information on said predetermined data track, said determining means determining said anticipated position correction term as:

$$P_{ant} = (P_0 - P_{-1}) + P_0/n$$

where $P_0$ is said current position of said head, $P_{-1}$ is a prior value of said current position of said head, and n is a constant between 1 and 100.

3. The disk drive of claim 2 wherein said determining means determines said adjustment value as:

$$O = (G \cdot P_{ant} \cdot r) - k$$

where O is said adjustment value, G is a gain constant, r is a gain reduction factor between 1 and 0.01, and k is a substantially constant track reference value, said determining means selecting the value of said gain reduction factor to be 1 where the polarity of the current and a prior value of $P_{ant}$ are the same and to be less than 1 where the polarity of the current and a prior value of $P_{ant}$ are different.

4. The disk drive of claim 3 wherein fields containing said servo information are equally spaced along said predetermined data track and wherein the servo information fields are successively read by said reading means with a period of less than about 400 microseconds.

5. A disk drive comprising:
   a) a rotating media having a plurality of data tracks provided on a surface thereof with each data track storing servo data interspersed with other data;
   b) an actuator, including an arm and a head mounted to said arm, for positioning said head relative to a predetermined one of said data tracks in response to a positioning signal;
   c) means, coupled to said head, for reading servo data from said predetermined data track indicative by magnitude and polarity of a present position of said head relative to the centerline of said predetermined one of said data tracks;
   d) control means, responsive to said reading means, for providing said positioning signal to said actuator as a product of a track-following control loop, said control means including compensator means for reducing the gain of said track-following control loop where the position of said head is oscillating about the centerline of said predetermined data track at a frequency approaching the resonant frequency of the arm of said actuator, said control means determining said positioning signal based on a gain factor, said present position of said head and an anticipated corrected position of said head relative to the centerline of said predetermined one of said data tracks, said determining means determining the magnitude of said gain factor based on the relative polarity of said present position of said head and said anticipated corrected position of said head relative to the centerline of said predetermined one of said data tracks.

* * * * *